US007162232B2

(12) United States Patent
Ramakesavan et al.

(10) Patent No.: US 7,162,232 B2
(45) Date of Patent: Jan. 9, 2007

(54) SELECTING WIRELESS DEVICES

(75) Inventors: Sundaram Ramakesavan, Chandler, AZ (US); Phillip J. Silvia, Rio Ranco, NM (US)

(73) Assignee: Intel Corporation, Santa Clara, CA (US)

( * ) Notice: Subject to any disclaimer, the term of this patent is extended or adjusted under 35 U.S.C. 154(b) by 924 days.

(21) Appl. No.: 09/895,584

(22) Filed: Jun. 29, 2001

(65) Prior Publication Data

US 2003/0003902 A1  Jan. 2, 2003

(51) Int. Cl.
*H04M 3/00* (2006.01)
(52) U.S. Cl. .................. 455/420; 455/418; 455/419; 455/426.2; 455/92; 455/186.1
(58) Field of Classification Search ............. 455/418, 455/419, 420, 426.2, 92, 186.1, 151.2, 151.1, 455/158.12, 416; 340/825.69, 825.71, 825.72; 348/734
See application file for complete search history.

(56) References Cited

U.S. PATENT DOCUMENTS

| 5,410,326 | A  | * | 4/1995  | Goldstein ............. 348/734 |
| 6,622,018 | B1 | * | 9/2003  | Erekson .............. 455/420 |
| 2001/0010503 | A1 | * | 8/2001  | Darbee et al. ........ 341/176 |
| 2001/0047518 | A1 | * | 11/2001 | Sahota et al. ......... 725/100 |
| 2002/0175944 | A1 | * | 11/2002 | Kolde et al. .......... 345/773 |

\* cited by examiner

*Primary Examiner*—Charles Appiah
*Assistant Examiner*—Randy Peaches
(74) *Attorney, Agent, or Firm*—Trop, Pruner & Hu, P.C.

(57) ABSTRACT

In the wireless communication system, a wireless selection device is able to select any of a plurality of sufficiently proximate wireless devices without the necessity to actually physically contact or operate any of those devices. Thus, a user may control any of a plurality of devices from a single wireless selection device. The wireless selection device may in some embodiments be a wireless pointing device or a wireless keyboard to mention two examples.

25 Claims, 5 Drawing Sheets

SELECTING WIRELESS DEVICES

Background

This invention relates generally to implementing wireless communication protocols.

A variety of wireless communication protocols are available currently. The Bluetooth protocol allows for relatively short-range wireless communications between devices such as desktop computer systems, peripherals, or any processor-based system, to mention a few examples. See the Specification of the Bluetooth System, Version 1.1 (Feb. 22, 2001) available from the Bluetooth Special Interest Group. The IEEE 802.11 standard is a longer range communication protocol that similarly allows processor-based devices and peripherals to communicate with one another. See Institute of Electrical and Electronics Engineers, Inc. (I.E.E.E.) Std. 802.11 1999 Edition, "Wireless LAN Medium Access Control and Physical Layer Specification" available from the I.E.E.E., Inc., New York, N.Y. 10016-5997, U.S.A.

Under the Bluetooth standard, a universal Bluetooth pointer is available that allows the user to communicate selectively with one of a plurality of wirelessly coupled devices. If there are a plurality of devices in the vicinity of the pointer, the pointer must select one of those devices to communicate with in particular. The solution to this problem under the Bluetooth standard is called limited device discovery. Communicating between the pointer and one particular device requires a manual action on both the device to be selected and the wireless pointer.

Requiring that the user manually actuate both devices may not be a desirable solution in all cases because it assumes that both devices are physically reachable by a single user. It precludes potential applications with public devices such as Bluetooth enabled Automatic Teller Machines (ATM) that may be out of the reach of users. In addition, a user who has a plurality of wirelessly coupled peripherals loses the benefit of wireless communication if the user must physically manually select each of a plurality of devices when needed.

Thus, there is a need for better ways to select from among a plurality of devices to initiate communications using a wireless communication protocol.

DETAILED DESCRIPTION

Figure 1:
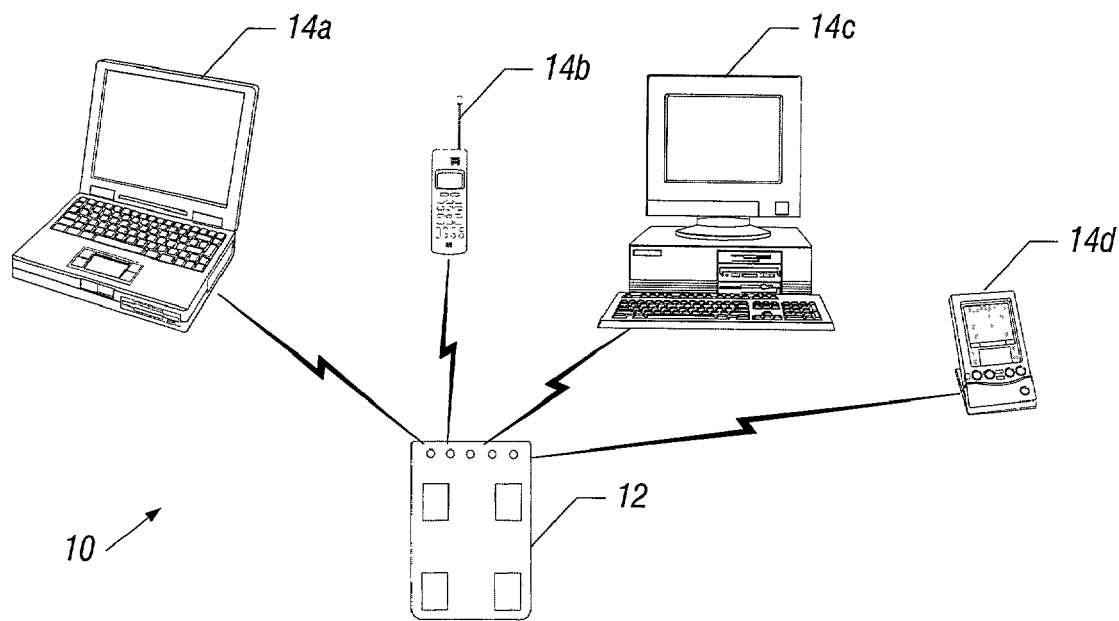
FIG. 1 is a schematic depiction of a wireless network in accordance with one embodiment of the present invention.

Referring to FIG. 1, a wireless selection device 12 may communicate with a plurality of processor-based devices or peripherals 14. While four such devices are illustrated in FIG. 1, any one of a variety of different devices may be communicated with, the number being determined by the applicable wireless communication standard. Two applicable wireless communication standards include the Bluetooth standard and the IEEE 802.11 standard.

The selection device 12 selects one of a plurality of sufficiently proximate devices 14 to communicate with at any one time. Thus, the selection device 12 allows the user to select from among a variety of proximate devices with which to communicate. Thus, the wireless selection device 12, in one embodiment, may be a wireless pointer, which may provide pointing functions on any of a plurality of wirelessly coupled devices 14. Alternatively, the wireless selection device 12 may be a keyboard, a joystick, or any of a variety of other devices.

Figure 2:
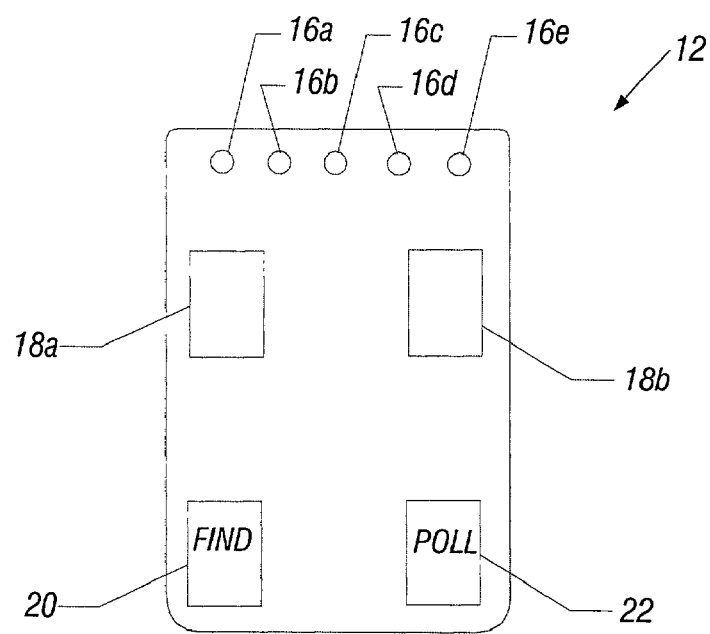
FIG. 2 is a front elevational view of a wireless selection device in accordance with one embodiment of the present invention.

Referring to FIG. 1, in one embodiment, the wireless selection device 12 includes a plurality of operators 16, 18, 20 and 22. In the embodiment illustrated in FIG. 2, the selection device 12 is illustrated as a wireless pointing device including left and right mouse buttons 18a and 18b. On one surface of the device 12 there may be an appropriate trackball or other position determining device. Thus, movement of the device 12, in one embodiment, can develop appropriate pointer position commands.

The wireless selection device 12, in one embodiment, also includes a FIND button 20, a POLL button 22 and a plurality of programmable operators 16. The operators 20, 22, and 16 may be implemented by any of a variety of user selectable technologies including physically depressible buttons or touch screens, as two examples.

Each of the programmable operators 16 may be programmed to relate to or be associated with a particular device 14 with which the selection device 12 may communicate. The assignment of a device 14 to a button 16 is completely programmable, in one embodiment, as will be described in more detail hereinafter. In addition, the operator 16 may include illumination devices so that, when a operator 16 is involved, it may be illuminated.

The FIND operator 20 is useful for enabling the selection device 12 to find all of the sufficiently proximate devices 14 with which it may communicate in any given position. Thus, when the FIND operator 20 is operated, the wireless selection device 12 progressively communicates with all compatible wirelessly connected devices 14 that are sufficiently proximate pursuant to the applicable communications standards. The device 12 may obtain identifying addresses from those proximate devices 14 and store them in an appropriate fashion. Thus, the FIND operator 20 is used to set up the environment that enables selection of a specific device 14.

The POLL operator 22 may be pressed to select a particular device 14. By successively pressing the POLL operator 22, successive devices 14 may be successively selected. The selected device 14 may provide an audible or visual indication in response to being selected in one embodiment. If the selected device 14 is associated with one of the operators 16, that operator 16 may be illuminated.

Figure 3:
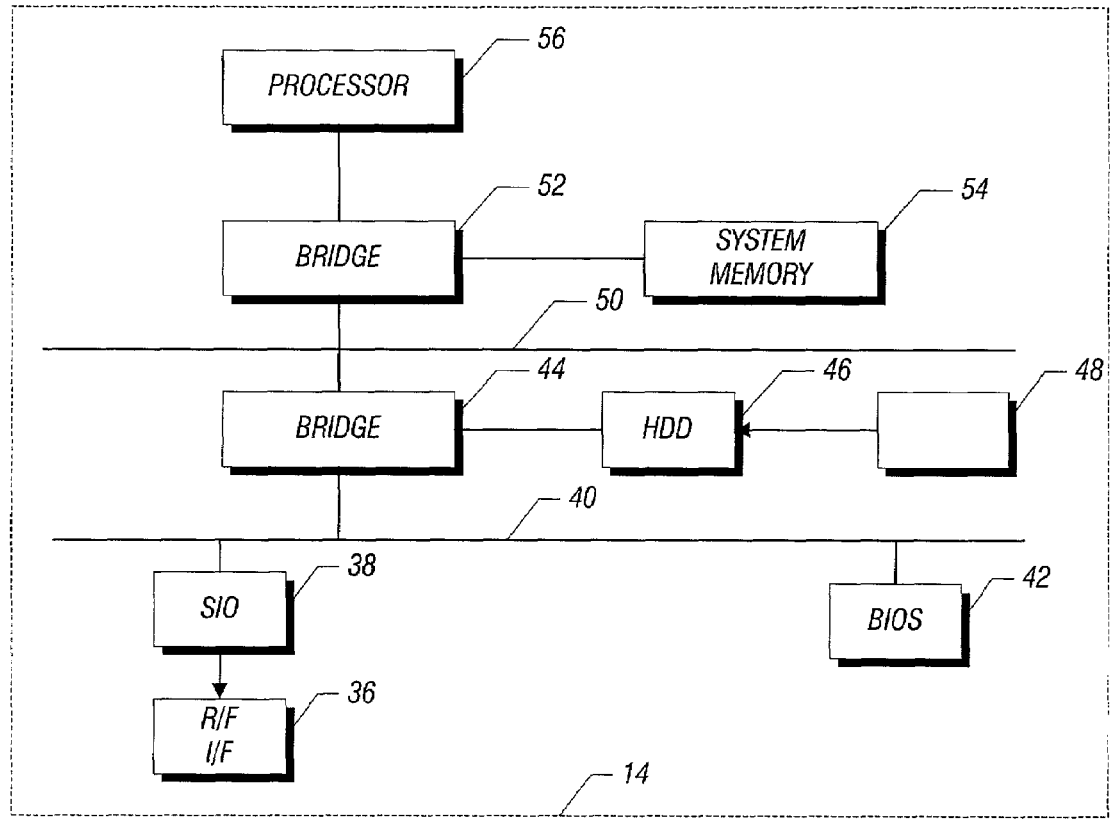
FIG. 3 is a block depiction of a wireless selection device and a processor-based system with which it communicates in accordance with one embodiment of the present invention.
Figure 3:
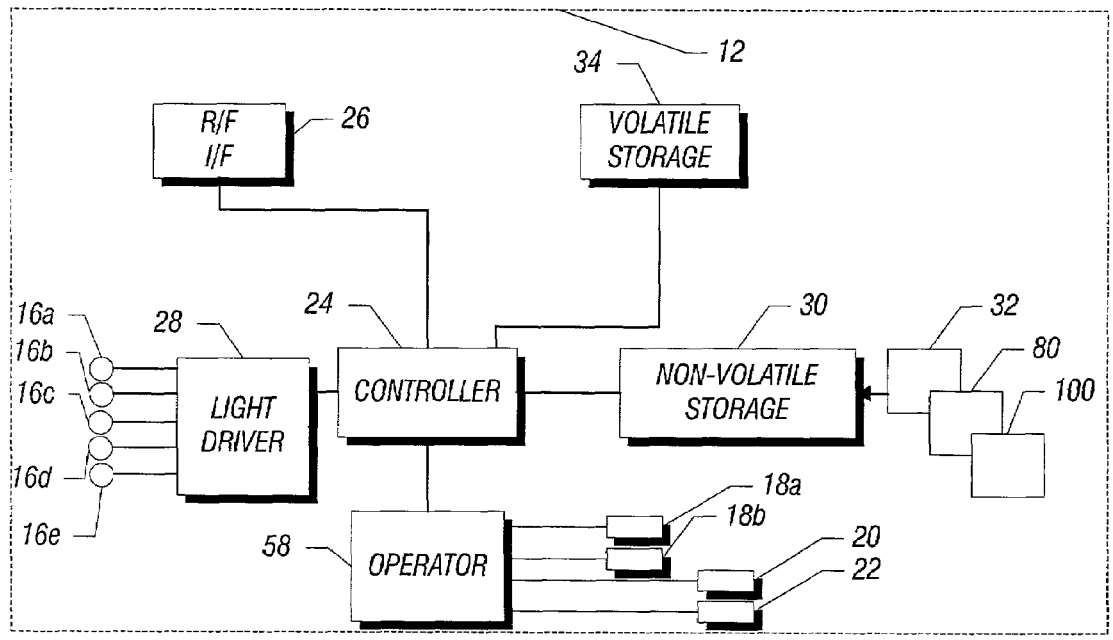

Referring to FIG. 3, the communications between the wireless selection device 12 and the desktop computing device 14c are illustrated in one embodiment. The wireless selection device 12 may include a controller 24 that is coupled to a non-volatile storage 30 and a volatile storage 34. The volatile storage 34 may be implemented, for example, by dynamic random access memory (DRAM). The non-volatile storage 30 may be implemented, for example, by flash memory in one embodiment. In some embodiments, the wireless selection device 12 is battery powered.

The controller 24 is also coupled to a button interface 58 that in turn communicates with the buttons 18a and 18b as well as operators 20 and 22. A light driver 28 communicates between the controller 24 and the operators 16a through 16e to illuminate the light emitting devices associated with each operator 16. In addition, the light driver 28 provides a button interface between the buttons 16 and the controller 24. The non-volatile storage 30 may be used to store software 32, 80 and 100.

The controller 24 also communicates with a radio frequency interface 26 in accordance with one embodiment of the present invention. The radio frequency interface 26 may be in accordance with a particular wireless communications standard. The interface 26 communicates wirelessly with an interface 36 of the device 14c.

The device 14c may otherwise be conventional and may use any of a variety of appropriate architectures. In the illustrated embodiment, the interface 36 communicates through a serial input output (SIO) device 38 with a bus 40 that also is coupled to a basic input/output system (BIOS) storage 42. The bus 40 in turn is coupled to a bridge 44. The bridge 44 in one embodiment may be coupled to another bus 50 and a hard disk drive (HDD) 46. The hard disk drive 46 may store software 48, which implements the wireless communications standard and is responsible for enabling the device 14c to appropriately respond with a visual or audible selection when selected by the selection device 12.

The bus 50 may be coupled to a bridge 52 and ultimately to the processor 56 in system memory 54 in one embodiment. Again, a variety of architectures are applicable with embodiments of the present invention and the present invention is in no way limited to the architecture illustrated in FIG. 3.

Figure 4:
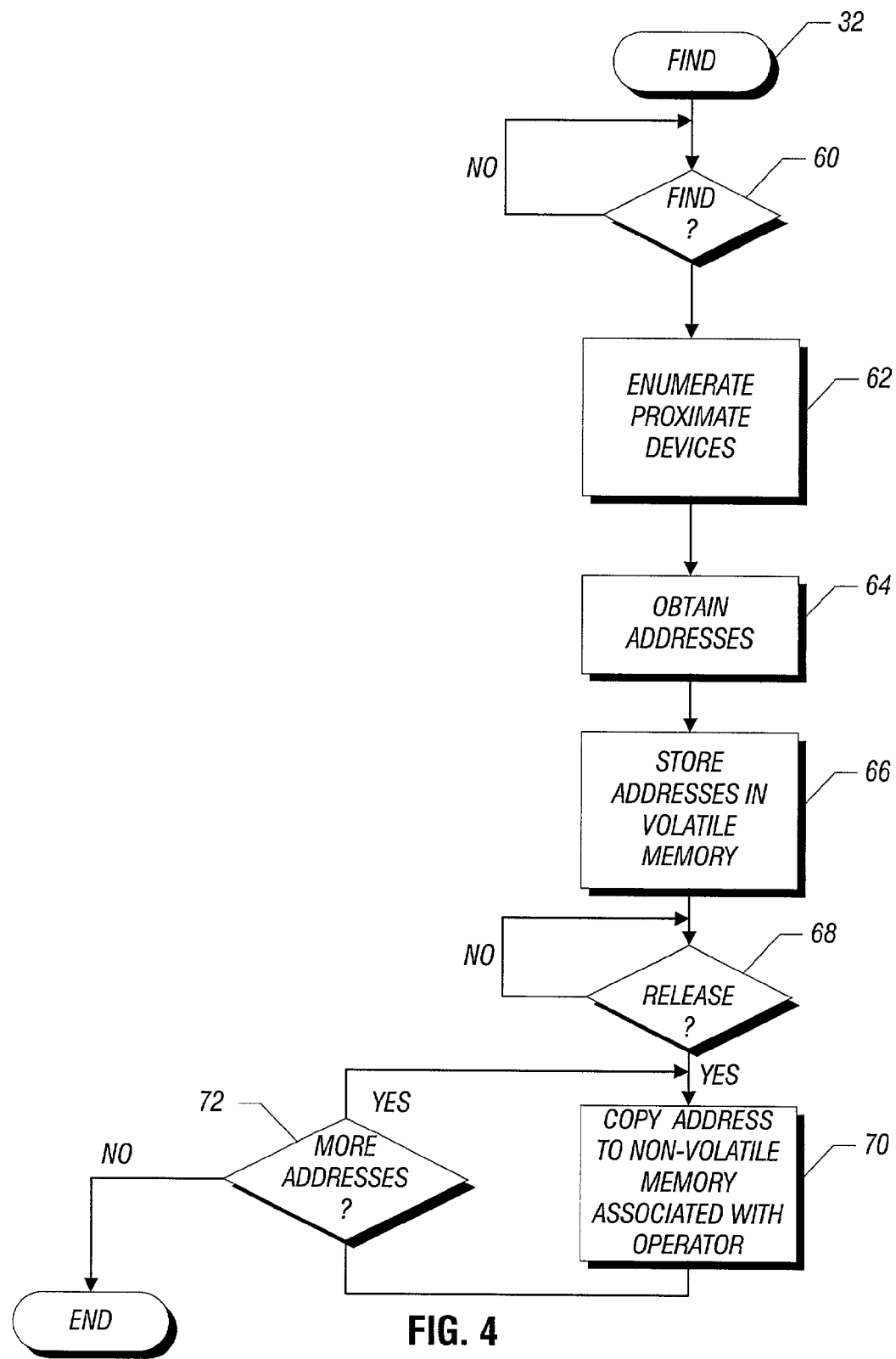
FIG. 4 is a flow chart for software for finding one of a plurality of wireless devices to communicate with in accordance with one embodiment of the present invention.

Referring to FIG. 4, the FIND software 32 may be stored on the wireless selection device 12, for example, in the non-volatile storage 30. In other embodiments, all or part of the processing tasks illustrated in FIG. 4 may be offloaded to one of the devices 14. In such case, the wireless selection device 12 may simply pass appropriate signals to a home base device 14, which then executes software 32 and provides the appropriate information, in simplified format, back to the wireless selection device 12.

The software 32, in one embodiment, begins by determining whether the FIND operator 20 has been operated as indicated in block 60. If so, the wireless selection device 12 enumerates the sufficiently proximate devices 14 as indicated in block 62. The enumeration of the proximate devices may be in accordance with an applicable communications protocol. An identifying address for each of the sufficiently proximate devices 14 may be obtained as indicated in block 64. Those addresses may be stored in a volatile storage 34 as indicated in block 66. In one embodiment, the addresses of the sufficiently proximate devices 14 may be successively stored in a circular buffer in the volatile storage 34.

Upon initial use, no identifying addresses are associated with any of the programmable operators 16 when the FIND operator 20 is released as determined in diamond 68. When release is detected, the first address of a sufficiently proximate device 14 in the circular buffer of the volatile storage 34 is copied to the non-volatile storage 30 associated with a programmable button 16. Each of the programmable buttons 16 may have an associated buffer position in the non-volatile storage 30 as indicated in block 70. A check at diamond 72 determines whether there are more addresses and if so, the flow iterates. Otherwise, the flow ends.

Figure 5:
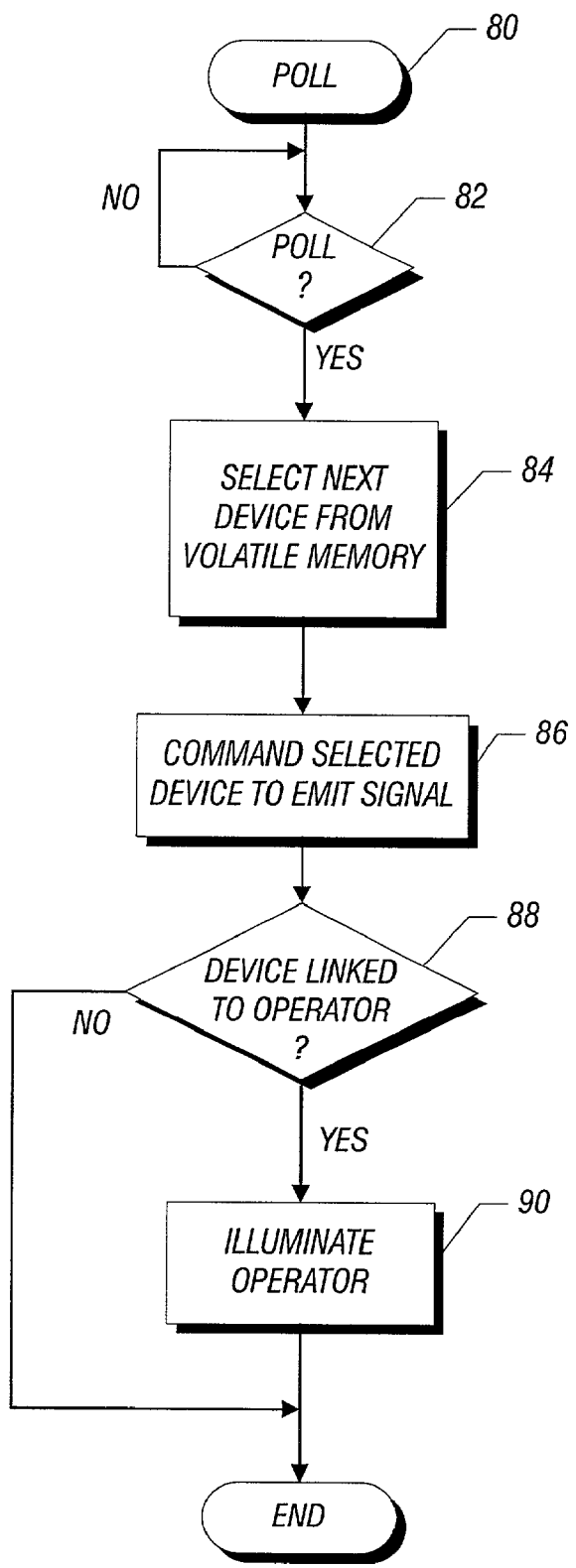
FIG. 5 is a flow chart for software for contacting a plurality of wirelessly coupled devices in accordance with one embodiment of the present invention.

Turning next to FIG. 5, the POLL software 80 is illustrated in accordance with one embodiment of the present invention. When the POLL operator 22 is operated as determined in diamond 82, the next device 14 in the circular buffer is selected as indicated in block 84. The selected device 14 may emit an audio and/or visual indication to inform the user that it has been selected in one embodiment. The audio or visual selection may simply be a beep or flashing symbol such as an icon or a combination of the same. Thus, the selection device 12a commands the selected device 14 to emit a signal as indicated in block 86.

A check at diamond 88 determines whether the selected device 14 is linked to a particular operator 16. If so, that operator 16 may be illuminated as indicated in block 90. By successively pressing the POLL operator 22, the user can select any device 14 stored in the circular buffer of the volatile storage 34. When a device 14 is selected through the POLL operator 22, it may be controlled by the selection device 12 even if the selected device 14 is not currently associated with one of the operators 16.

Figure 6:
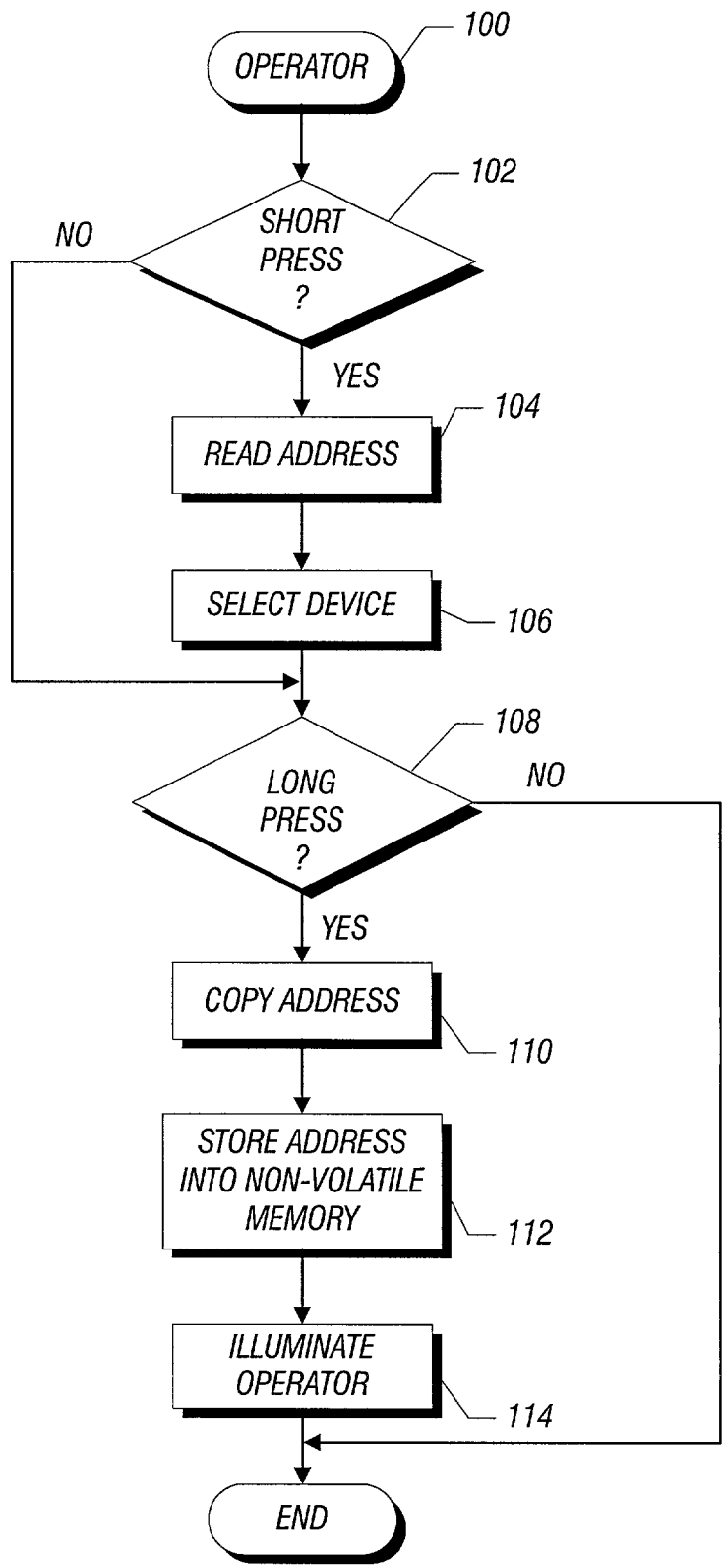
FIG. 6 is a flow chart for software for operating one of a plurality of programmable buttons on a wireless selection device in accordance with one embodiment of the present invention.

Finally, referring to FIG. 6, the operator 16 software 100 begins by determining whether a operator 16 has been pressed with what may be described as an identifying press. In one embodiment, an identifying press is a relatively short button operation, for example, when the operator 16 is pressed and released within one second. Other identifying presses may be utilized as well. In still other embodiments, multiple operators may be used.

When a shorter press is detected, as indicated in diamond 102, the selection device 12 reads the address of a device 14 obtained from the corresponding non-volatile storage 34 and selects that device as indicated in blocks 104 and 106. The device 14 may have been selected by operating either the POLL operator 22 or the FIND operator 20. If no device 14 address is currently selected, then in one embodiment, the software 100 may automatically take the first address and the circular buffer and associate it with the selected programmable operator 16.

If a longer press is detected at diamond 108, a different operation may occur. In one embodiment, if the user presses the operator 16, for a sufficiently long time, such as two seconds, a longer press is detected. However, any of a variety of techniques may be utilized for distinguishing the user's selection of a particular operator 16 or a plurality of buttons may be utilized.

When a longer press is detected the address of the currently selected device 14 is copied from the volatile storage 34 to a non-volatile storage 30 location corresponding to the selected programmable button 16 as indicated in blocks 110 and 112. The current selection then remains unchanged. The selected operator 16 illuminates upon release to indicate that it has been selected as indicated in block 114.

Thus, in one example, a typical usage model may be as follows. The user may go home and press the FIND operator 20. When the user presses the POLL operator 22 several times, the user may discover his home desktop computer 14c, home laptop computer 14a, home personal digital assistant 14b, and home cordless telephone 14d. The user may then operate the operator 16a and hold it down for a sufficient amount of time to program the home desktop computer 14c to the operator 16a. From this point onwards, the user can select the home desktop computer 14c by simply pressing the operator 16a. This information is not lost when the user presses the FIND operator 20 or POLL operator 22 again.

If thereafter, the user goes to his office and presses the FIND operator 20 or the POLL operator 22 again he may discover, in one embodiment, his office computer, an office printer, a cell phone and a handheld computer. The user may program the operators 16b, 16c and 16d to select his office computer, cell phone and a handheld computer. Then, when the user goes home, the user may press the operator 16a and start using the selection device 12 to control the home desktop computer 14c. When the user presses the operator 16b he may find that the selection device 12 still controls his home desktop computer 14c because it could not find the office computer at home.

When the user presses the operator 16d, the user realizes that the selection device 12 has stopped controlling the home desktop computer 14c and started controlling his handheld computer 14d, which he brought home with him from the office. The user may then go back to work and press the operator 16d to still control his handheld computer 14d, which he again brought with him. The user can press the operator 16b at work and find that the selection device 12 controls his office computer and stops controlling the handheld computer 14d.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   remotely selecting one of a plurality of devices for wireless communications using a device having operators associated with at least two of said devices, and enabling different actuations of said operators to be interpreted selectively as either the selection of a device for communication or the programming of the operator to communicate upon actuation with a particular device.

2. The method of claim 1 including establishing an ad hoc wireless network between a plurality of processor-based devices.

3. The method of claim 1 including selecting one of said devices to communicate with using a wireless selection device.

4. The method of claim 3 including selecting one of said devices to communicate with using a wireless pointer.

5. The method of claim 1 including enabling a user to selectively identify sufficiently proximate devices.

6. The method of claim 1 including enabling a user to successively poll sufficiently proximate devices.

7. The method of claim 3 including enabling the user to program a plurality of operators on said wireless selection device, each of said operators being programmed with the identity of one of a plurality of sufficiently proximate devices.

8. The method of claim 7 including enabling a light to be activated when one of said operators is programmed.

9. The method of claim 3 including initially storing the identities of said proximate devices in a volatile memory and associating each device with a different operator on the wireless selection device.

10. An article comprising a medium storing instructions that, if executed, enable a processor-based system to:
    remotely select one of a plurality of devices for wireless communications using a device having operators associated with at least two of said devices, and enable different actuations of said operators to be interpreted selectively as either the selection of a device for communication or the programming of the operator to communicate upon actuation with a particular device.

11. The article of claim 10 further storing instructions that enable the processor-based system to establish an ad hoc wireless network between a plurality of processor-based devices.

12. The article of claim 10 further storing instructions that enable the processor-based device to select one of said devices to communicate with using a wireless selection device.

13. The article of claim 12 further storing instructions that enable the processor-based system to select one of said devices to communicate with using a wireless pointer.

14. The article of claim 12 further storing instructions that enable the user to program a plurality of operators on said wireless selection device, each of said operators being programmable with the identity of one of a plurality of sufficiently proximate devices.

15. The article of claim 14 further storing instructions that enable a processor-based system to activate a light when one of said operators is programmed.

16. The article of claim 12 further storing instructions that enable the processor-based system to initially store the identities of proximate devices in a volatile memory and associate each device with a different operator on the wireless selection device.

17. The article of claim 16 further storing instructions that enable the processor-based system to detect a characteristic of the operation of an operator and in response to the detection of a characteristic, selectively determine whether to select a device or program a device to be selected by a particular selection operator.

18. The article of claim 10 further storing instructions that enable the processor-based system to enable a user to selectively identify sufficiently proximate devices.

19. The article of claim 10 further storing instructions that enable the processor-based system to enable a user to successively poll sufficiently proximate devices.

20. A system comprising:
    a mouse apparatus;
    a wireless interface coupled to said apparatus;
    a controller, coupled to said wireless interface, to enumerate a plurality of devices for wireless communications and remotely select one of said devices to communicate with; and
    a volatile storage and a nonvolatile storage, identifying information about sufficiently proximate devices is initially stored in said volatile storage and then is selectively transferred to said nonvolatile storage.

21. The system of claim 20 including a first operator to identify sufficiently proximate devices.

22. The system of claim 20 including a second operator to select one of a plurality of sufficiently proximate devices.

23. The system of claim 20 including a plurality of programmable operators, each of said operators being programmable to select one of a plurality of sufficiently proximate devices.

24. The system of claim 23 wherein said operators are buttons.

25. The system of claim 24 wherein said buttons illuminate when programmed.

* * * * *